United States Patent [19]

Soubrier et al.

[11] Patent Number: 4,924,891
[45] Date of Patent: May 15, 1990

[54] APPARATUS FOR CLEANING AND/OR DECONTAMINATING A CONTINUOUS STRIP OF THERMOPLASTSIC FILM

[75] Inventors: Pierre Soubrier, Brussels; Bernard Desmet, Renaix, both of Belgium

[73] Assignee: Baxter International Inc., Deerfield, Ill.

[21] Appl. No.: 173,529
[22] PCT Filed: Jun. 23, 1987
[86] PCT No.: PCT/BE87/00009
 § 371 Date: Feb. 22, 1988
 § 102(e) Date: Feb. 22, 1988
[87] PCT Pub. No.: WO88/00158
 PCT Pub. Date: Jan. 14, 1988

[30] Foreign Application Priority Data

Jun. 26, 1986 [BE] Belgium ................... 0/216844

[51] Int. Cl.⁵ .................................. B08B 3/02
[52] U.S. Cl. ....................... 134/64 R; 134/122 R; 134/199; 134/200; 53/167; 422/305
[58] Field of Search ............... 134/64 R, 64 P, 94, 134/102, 104.4, 198, 199, 200, 122 R, 122 P; 68/5 E, 5 C, 5 D; 53/167, 425; 422/292, 305

[56] References Cited

U.S. PATENT DOCUMENTS

| | | |
|---|---|---|
| 508,094 | 11/1893 | Duckworth .................. 68/5 D X |
| 2,234,153 | 3/1971 | Herbert . |
| 2,532,471 | 12/1950 | Welder ....................... 68/5 D |
| 2,967,119 | 1/1961 | Gutterman . |
| 3,055,158 | 9/1962 | Smith ....................... 134/172 X |
| 3,318,114 | 5/1967 | Schneider .................. 68/5 D |
| 3,370,902 | 2/1968 | Hayunga ................. 134/64 R X |
| 3,383,831 | 5/1968 | Goldsmith . |
| 3,466,841 | 9/1969 | Rausing . |
| 3,491,778 | 1/1970 | Lehnert et al. ........... 134/122 R X |
| 3,511,592 | 5/1970 | Tuma . |
| 3,513,627 | 5/1970 | Doucette et al. . |
| 3,593,543 | 7/1971 | Bergman .................... 68/5 D |
| 3,609,781 | 10/1971 | Dunderdale .............. 68/5 D X |
| 3,634,099 | 1/1972 | Wilson . |
| 3,904,361 | 9/1975 | Egger . |
| 3,911,642 | 10/1975 | Ernstsson et al. . |
| 3,929,409 | 12/1975 | Buchner et al. . |
| 3,933,428 | 1/1976 | Egger . |
| 3,947,249 | 3/1976 | Egger . |
| 3,972,153 | 8/1976 | Kiellarson et al. . |
| 3,972,679 | 8/1976 | Ruig . |
| 3,986,832 | 10/1976 | Smorenburg . |
| 4,057,391 | 11/1977 | Yamaguchi . |
| 4,100,660 | 7/1978 | Nemecek et al. ............. 68/5 E |
| 4,104,024 | 8/1978 | Vogele . |
| 4,225,556 | 10/1980 | Lothman . |
| 4,244,078 | 1/1981 | Hughes et al. ............ 134/122 Y |
| 4,366,125 | 12/1982 | Kodera . |
| 4,391,080 | 7/1983 | Brody . |
| 4,396,582 | 8/1983 | Kodera . |

FOREIGN PATENT DOCUMENTS

| | | |
|---|---|---|
| 0142758 | 5/1985 | European Pat. Off. . |
| 2339128 | 10/1980 | Fed. Rep. of Germany . |
| 94398 | 8/1969 | France . |
| 2043839 | 5/1970 | France . |
| 2352711 | 12/1977 | France . |
| 2528801 | 6/1982 | France . |
| 1517209 | 7/1978 | United Kingdom . |

Primary Examiner—Frankie L. Stinson
Attorney, Agent, or Firm—Paul E. Schaafsma; Mary J. Schnurr; Paul C. Flattery

[57] ABSTRACT

Device for continuous cleaning and/or decontaminating a band of a thermoplastic film comprising a housing (1) where the band (7) follows a sinuous trajectory between return cylinders (8, 10, 40, 41, 9) and is subjected to the action of demineralized and/or distilled water jets projected by nozzles, (20, 43, 45, 22) mounted on spraying ramps (19, 42, 46, 21), the direction of jets being preferably opposite to the feed direction of the band (7).

18 Claims, 7 Drawing Sheets

APPARATUS FOR CLEANING AND/OR DECONTAMINATING A CONTINUOUS STRIP OF THERMOPLASTSIC FILM

BACKGROUND OF THE INVENTION

The present invention relates to a device that cleans and/or to decontaminates, in a continuous manner, a strip of a thin film of thermoplastic material. It relates, more specifically although not exclusively so, a device for cleaning the two opposite faces of a continuous strip of film of thermoplastic material, for example a strip formed by at least one layer of a polyolefin material, such as polyethylene or polypropylene, for the purpose, among other things, of using that cleaned strip for the fabrication of flexible bags containing a perfusion liquid to be administered intravenously to a patient.

Manufacturers of films of thermoplastic material, of polyethylene for example, deliver the latter in the form of rolls having a pre-determined width. During the fabrication of those films, by extrusion for example, and during their conditioning, such as their sectioning to the desired width and their being wound on a mandrel, as well as during their transportation, their handling and their treatment, those films generally are contaminated by particles of an extrinsic nature or by fragments or particles that are generated by the films themselves.

When the web of film is to be used for the fabrication of flexible bags or pouches for containing perfusion liquids, it is important that they be free of contaminating particles. If there are particles that adhere to the film, the particles may injure the patient in that the particles could be carried along with the perfusion liquid into the circulatory system of the patients.

It is also important that the face of the film, which is in contact with the perfusion liquid, be sterile, so as to prevent germs or other possible pathogenic microorganisms from contaminating the perfusion liquid and being carried therewith into the circulatory system of the patients.

There is known a system for cleaning and sterilizing in a continuous manner a web of film made of thermoplastic material. The web is fed through a static bath of a liquid which may be, for example, a sterilizing liquid, such as hydrogen peroxide. That known system, however, often does not satisfactorily remove all the particles that may be adhering to the film. The system includes the additional disadvantage of requiring a periodic replacement of the bath which progressively becomes loaded with particles and micro-organisms and therefore must be replaced.

SUMMARY OF THE INVENTION

The present invention provides an improved system for removing particles and other contaminants from a web of film.

It has now been discovered that the removal of the particles and other contaminating materials from a film of thermoplastic material, that is of such a nature that may be charged with static electricity and therefore attract and retain such particles can be accomplished very efficiently when there is sprayed on the film, which is moving in a given direction, a liquid in the form of jets directed opposite to the direction the film is moving. There is obtained through this method a dynamic effect that improves the removal of the particles and other contaminating materials.

It has also been discovered that, in order for the particles and other contaminating materials to be easily removed from the film without being redeposited on the film, the liquid should be sprayed over the film while the film follows a steeply inclined trajectory, if not an approximately vertical one.

The present invention, provides a device for the cleaning and/or the decontamination of a continuous strip of a film of thermoplastic material. The device comprises an enclosure inside of which a sterile air pressure is maintained and inside of which the continuous strip is moved along a sinuous trajectory around return rollers between an inlet and an outlet of the enclosure. At least one approximately horizontal ramp, equipped with nozzles, is mounted inside the enclosure. Accordingly, it is possible to spray on one face of the strip, jets of a cleaning and/or decontaminating liquid. The liquid loaded with contaminating particles that have been removed from the strip is dripped into the bottom of the enclosure.

In an embodiment of the present invention, the ramp is positioned to permit the spraying of the above-mentioned liquid over a first face of a slanted section which follows an ascending trajectory and which extends between a lower return roller and an upper roller which returns the strip. The first face is located opposite the second face in contact with the lower return roller, and is slanted relative to the vertical direction in the direction of rotation of the lower roller.

During such a spraying, the cleaning and/or decontaminating liquid runs down the first face of the slanted section and carries away the contaminating particles, toward the lower return roller. Close to the latter, the cleaning and/or decontaminating liquid loaded with particles becomes separated from the strip by gravity and falls to the bottom of the enclosure, preventing the particles from redeposited on the strip.

The nozzles of the ramp, or ramps, are oriented in a direction approximately opposite the direction of movement of the strip. Preferably, the nozzles are oriented at an angle of approximately 30° to about 90°, most preferably of approximately 40° to about 60° with respect to the strip onto which they are spraying liquid.

In an embodiment of the device of the present invention, there is provided at least one pair of ramps having nozzles, one mounted on each side of the strip at approximately the same level. Other embodiments of the device, however, may include several ramps or pairs of opposite ramps, positioned so that their nozzles will spray a cleaning and/or decontaminating liquid over successive sections, shifted relative to one another, of the movable strip moving forward inside the afore-mentioned enclosure.

According to the present invention, the ramps, or pairs of ramps, which extend transverse to the strip of film are mounted at two different levels and may be fed a different liquid. For example, demineralized water and distilled water.

In an embodiment, the device according to the present invention provides an intake for the strip of film near the lower end of the enclosure. A first return roller is located approximately at the intake level, a second return roller is located near the upper end of the enclosure, and a third return roller is located near the lower end of the enclosure and shifted with respect to the first roller. Accordingly, the strip moving inside the enclosure will move upward between the first and the second rollers, following an approximately vertical-trajectory, then downward between the second and the third rollers. A first group of two opposite ramps are positioned one on each side of the strip being placed on the strip trajectory between the first and second rollers, while a second group of opposite ramps, also positioned one on each side of the strip, is also placed on the strip trajectory between the first and second rollers, at a level higher than that of the first group of ramps. The nozzles of the first group of ramps spray demineralized water on the strip, while the nozzles of the second group of ramps spray distilled water on the strip.

In an embodiment of the apparatus according to the present invention, the device includes a first return roller located at approximately the level of entry of the continuous strip into the enclosure at the lower part of the latter, a second return roller located near the upper end of the enclosure and a third return roller located close to the lower end of the enclosure and shifted with respect to the first roller. Accordingly, the strip moving inside the enclosure will move upward following an inclined trajectory between the first roller and the second roller, then downward between the second roller and the third roller. A first group of two opposite ramps are positioned one on each side of the strip being placed on the strip trajectory between the first and second rollers, while a second group of opposite ramps, are positioned also one on each side of the strip is also placed on the trajectory of the strip between the first and second rollers, but at a level higher than that of the first group of ramps. The first group of ramps spray demineralized water on the strip, while the second group of ramps spray distilled water on the strip.

In an embodiment of the embodiment set forth above, a partition is placed inside the enclosure between the first and last rollers. The partition prevents some of the particles carried away by the above-mentioned cleaning and/or decontaminating liquid from being redeposited on the strip.

Where the strip of thermoplastic film is highly charged with particles or is highly contaminated, or when a high degree of cleaning and/or decontaminating is required, the present invention provides, in an embodiment, in the above-mentioned enclosure, three return rollers spaced apart from one another at the lower part of the enclosure, and two return rollers, also spaced apart from each other at the upper part of the enclosure. When passing over these different return rollers, the strip of film will form four successive sections which alternately are vertical and steeply inclined, between the intake and the outlet of the enclosure. In this embodiment, each vertical section of the strip is subjected to the action of the nozzles carried by two pairs of opposite ramps positioned one on each side of the strip. The nozzles of the two pairs of ramps associated with the first vertical section of the strip, as well as the nozzles of the lower pair of ramps associated with the second vertical section of the ramp, spray demineralized water over the opposite faces of the strip of film, while the nozzles of the upper pair of ramps associated with the second vertical section of the strip spray distilled water over the opposite faces of that strip. Thus, in this embodiment of the device, two pairs of opposite ramps are provided along the trajectory of the two vertical sections of the film strip, to which a forward motion is imparted, one of those pairs of ramps being at a level lower than the other pair.

In an embodiment of the present invention, means are provided for adjusting the orientation of the ramp nozzles. Means can also be provided for adjusting the level of the ramps as well as their distance from the strip. In addition, the ramps can also be longitudinally adjustable (that is, in the direction of their axis).

According to another embodiment of the invention, means are provided for drying the strip prior to its exit from the enclosure. To this end, there is provided adjacent to its outlet, a chamber in which one and/or the other of the strip faces are subjected to jets of air produced by nozzles carried by at least one ramp. A thermostat permits the regulation of the temperature of the drying air which feeds the drying ramp or ramps.

At its upper portion, the enclosure includes a ceiling having multiple perforations for permitting the passage of sterile air into the enclosure which forms a conditioned air atmosphere inside the enclosure.

At its lower portion the enclosure includes a collector for the liquid or liquids that are sprayed over the strip. The collector is in the form of a hopper. A slit of adjustable width is provided between the lower edge of the enclosure and the upper edge of the hopper, the slit permits the escape, at a predetermined rate of flow, of the air contained in the enclosure, so that air circulation is established inside the latter, the pressure of that air being, at the level of its intake (ceiling) into the enclosure, a few centimeters, approximately 2 to about 4 centimeters for example, of a column of water.

The return rollers are of a squirrel cage type and rotate freely as the strip of film passes through the enclosure.

Downstream from the enclosure, in the direction of movement of the strip of thermoplastic film, the strip is pulled by being passed between two rollers. One of the rollers is driven by an electric motor. One of the rollers is also coated with a rubber or with plastic material.

Other features and advantages of the present invention will be apparent from the following detailed description of the presently preferred embodiments and the drawings.

BRIEF DESCRIPTION OF THE DRAWINGS

In the figures, the same reference notations refer to identical elements.

DETAILED DESCRIPTION OF THE PRESENTLY PREFERRED EMBODIMENTS

The present invention provides improved devices for cleaning and/or decontaminating a web of film.

The cleaning and/or decontaminating devices described below advantageously are part of a system for the fabrication of flexible bags or pouches, which provide for the slow flow of liquids, especially bags containing physiologically acceptable liquids that are administered intravenously to patients. Such a system essentially comprises a station for the unwinding of a strip of film of thermoplastic material, from a feeding roll, a station for the printing of information on one face of the strip, a station for the formation of holes, that are to receive ports or fitments in the strip, and a station for the fabrication of the bags or pouches through the sealing of the film, for example, in the manner described in document FR-A-258801. In that system, a device for the cleaning and/or decontaminating according to the present invention is mounted immediately upstream from the station for the fabrication of the bags.

Figure 1:
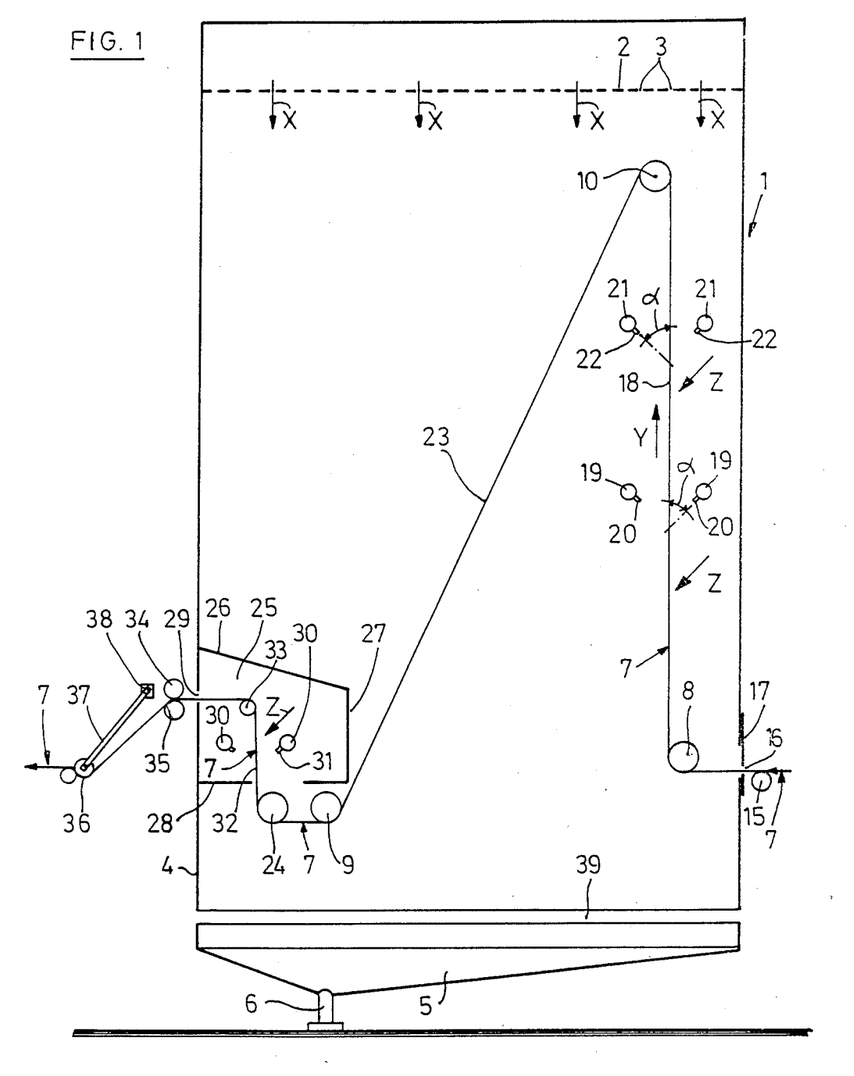
FIG. 1 illustrates a diagramatic view, in lateral elevation, of an embodiment of the apparatus of the present invention.

In the embodiment of the present invention illustrated in FIG. 1, of the apparatus of the invention, the apparatus includes an enclosure 1 having a ceiling 2 with multiple perforations 3 through which sterile air coming from a source (not illustrated) is blown in, in the direction illustrated by arrows X, into the entire cross-section of enclosure 1. The pressure of that air, in the enclosure 1, is preferably a few centimeters of a column of water, approximately 2 to about 4 cm for example. This slightly higher pressure of the air inside the enclosure 1 prevents non-sterile outside air from entering the enclosure.

The lower portion 4 of the enclosure 1 is open and located above a hopper 5, that is asymmetical in shape, that serves as a liquid collector, as will be discussed below. The hopper 5 is connected to a discharge duct through a duct 6. A syphon (not illustrated) is located in the duct 6.

A thin continuous strip 7 of thermoplastic material, for example, a strip formed of one layer or of several joined layers of polyethylene, follows a sinuous trajectory, through enclosure 1, between two lower rollers 8, 9 and an upper roller 10. The upper roller 10 is positioned directly above the lower roller 8 near the ceiling 2. The lower rollers 8, 9 are positioned near the lower open end 4 of the enclosure 1.

Figure 7:
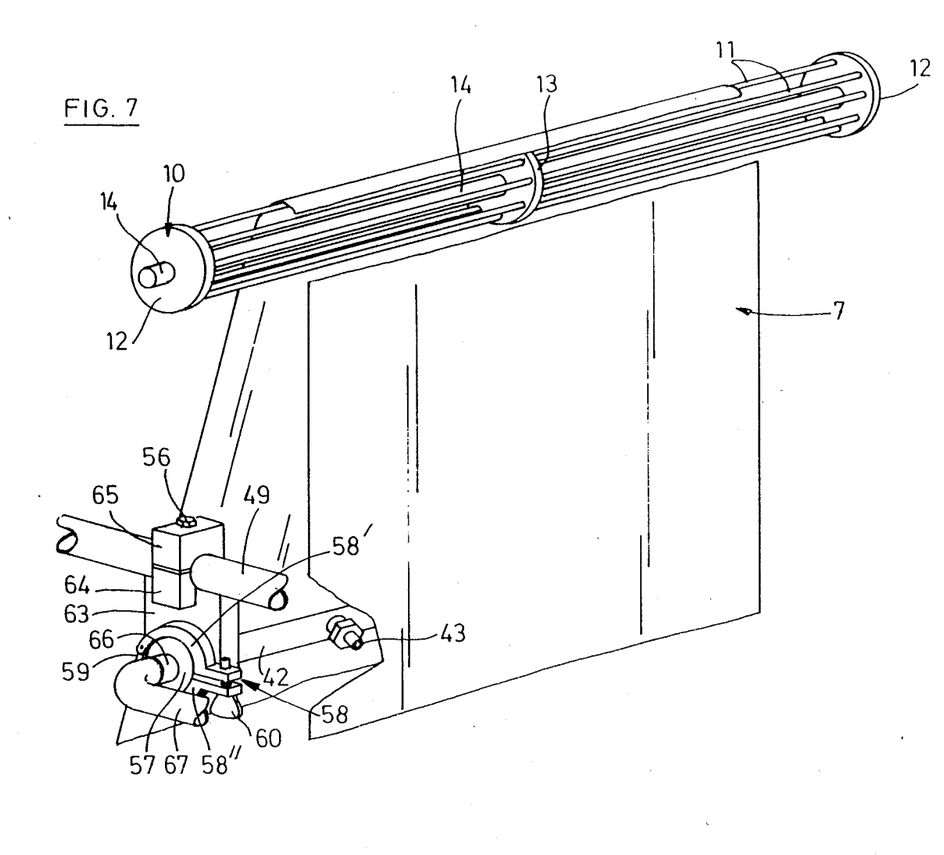
FIG. 7 illustrates a perspective view of a return roller and a ramp for the spraying of cleaning liquid.

The rollers 8, 9, 10, which have horizontal axes, are of the "squirrel-cage" type (see FIG. 7). Each roller 8, 9, 10 includes series of bars 11 having a circular cross-section, and that are connected at each one of their ends to a circular disk 12. At a mid-point of the bars 11, the latter are also connected to a median circular disk 13 which serves to hold the rollers 8, 9, 10 rigid. The centers of the disks 12 and 13 are located on the geometric axis of the rollers 8, 9, 10. These rollers 8, 9, 10 comprise a longitudinal shaft 14, attached to the disks 12, 13, the ends of the shaft 14, which extends to the outside of the rollers 8, 9, 10, is supported in such a manner that it allows the free rotation of those rollers.

The strip 7 of thermoplastic material, which may be approximately 40 to about 60 cm in width or more, is fed through the enclosure in a direction indicated by arrows Y. The strip 7 passes an external guiding roller 15, and enters the enclosure 1 through an intake 16, which is fitted with a shutter 17 of rubber or some other deformable material. The shutter 17 functions as a closing device that limits the escape of the pressurized air from enclosure. The strip 7 then passes over a lower return roller 8, which rotates in a clockwise direction. From the lower return roller 8, the strip follows a vertical trajectory toward the upper roller 10 which sends it back, by rotating counterclockwise, toward the lower roller 9, following an inclined trajectory. On the vertical section 18 located between the return rollers 8 and 10, the strip 7 is subjected to the action of cleaning and/or decontaminating means.

The cleaning and/or decontaminating means includes a first pair of ramps 19 having nozzles 20. The ramps 19 are connected to a source of demineralized water, and spray through their nozzles 20 jets of demineralized water over the opposite faces of strip 7, while the latter is moving upward inside the enclosure 1, following an approximately vertical trajectory. As shown in FIG. 1, the nozzles 20 of the ramps 18 mounted on each side of the vertical section 18 of the strip 7 are oriented to form, with the strip, an angle which may vary between approximately 30° and about 90°. In a preferred embodiment the nozzles are oriented at an angle of between approximately 45° and about 60° with respect to the strip. The jets of demineralized water discharged by the nozzles is directed in a general direction (arrow Z) opposite the direction of forward motion of the strip 7 between the return rollers 8 and 10 (vertical arrow Y).

Above the first pair of ramps 19 is positioned a second pair of ramps 21 fitted with nozzles 22. The second pair of ramps 21 sprays distilled water over the opposite faces of strip 7. The orientation of the nozzles 22 can be the same as that of the nozzles of the first pair of ramps 19.

The demineralized water and distilled water is sprayed at a rate of delivery and under a pressure which may be adjusted to create, a dynamic cleaning and/or decontaminating effect on the opposite faces of strip 7, so as to free, for the most part, all of the particles and micro-organisms which adhere to it.

The liquids sprayed over the strip 7, run downwardly on the vertical section 18 of strip 7, and drip down toward the bottom 4. The sprayed liquids carry with them the particles that have been detached from the strip 7.

Between the return roller 10 and the return roller 9, the strip 7 follows an inclined trajectory (section 23) which allows the residual liquids to run downwardly.

After passing over the return roller 9, the strip 7 further runs over a return roller 24, of the squirrel-cage type. The strip, then enters a drying chamber 25 formed by walls 26, 27, 28. The drying chamber 25 is mounted inside the enclosure 1, immediately upstream from an outlet 29 of the enclosure 1.

In the drying chamber 25 are provided, on each side of strip 7, ramps 30 equipped with openings 31 oriented toward the strip 7 in a direction opposed to (arrow Z) that of a vertical section 32 of that strip 7. Air, or some other sterile or sterilizing gas, is blown onto strip 7 through the openings 31. The temperature of the air and its rate of flow through the openings 31 of course can be adjusted, so that downstream from the ramps 30, the strip 7 will be dry.

By using rollers 8, 9, 10, 24 of the squirrel-cage type it is possible to prevent the accumulation, on those rollers, of particles or micro-organisms that are detached from the strip. Those rollers themselves are dynamically washed by the liquids sprayed over strip 7.

The strip 7, dried by jets of air or of gas delivered through openings 31, passes over a return roller 33 (which may be a roller with a solid cylindrical surface), before leaving the enclosure 1 through outlet 29 of the latter.

Two rollers 34, 35, mounted the outlet 29 of the enclosure 1, outside of the latter, serve to drive the strip 7. Roller 34, the cylindrical surface constructed of which is of rubber or of a similar material, is driven by a motor (not illustrated) and the strip 7 is fed by being pinching between this driving roller 34 and roller 35.

Downstream from the rollers 34 and 35, the strip 7 passes over a roller 36 carried by the parallel arms 37 of a lever that can pivot around a shaft 38. This lever serves to maintain the strip 7 under tension by taking back or compensating for the loss of tension caused by the periodic stops in the forward motion of this strip 7. This is especially important at the sealing station (not illustrated) where the bags are created by being sealed and filled with a perfusion liquid.

It is obvious that upstream from the enclosure 1, the strip 7, which is moving toward the above-mentioned bag fabrication station, should be kept under a sterile atmosphere so as to prevent its recontamination.

Between the open lower end 4 of the enclosure 1 and the collecting hopper 5, there is a gap 39, forming a slit of adjustable width (as will be seen below). That slit 39 permits the escape of the sterile air under pressure that is fed into the enclosure 1 through the perforations 3 made in the ceiling 2 of the enclosure 1. Instead of providing a gap between the lower end 4 of the enclosure and the free edge of the hopper 5, it is of course possible to connect the latter with a tight seal to that lower end, and to provide an air-escape slit either in the lower part of the enclosure 1, or in the upper part of hopper 5.

Figure 2:
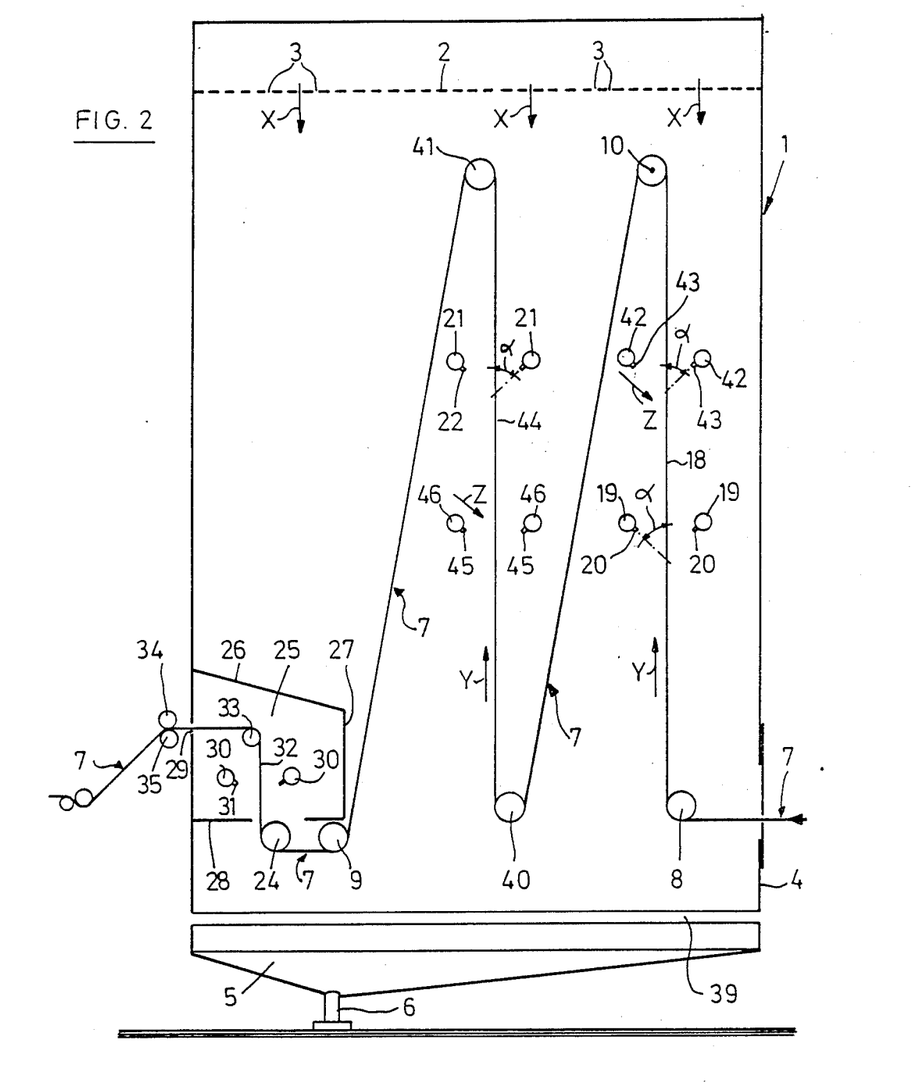
FIG. 2 illustrates a diagramatic view, in lateral elevation, of another embodiment of the apparatus of the present invention.

A second embodiment of the device according to the present invention, illustrated in FIG. 2, is similar to the one described above with reference to FIG. 1, with the exception that the strip 7 is made to pass, inside enclosure 1, over a larger number of return rollers of the squirrel-cage type. Accordingly, the strip follows a more sinuous trajectory. Also additional cleaning and-/or decontaminating means are provided.

After the strip has passed over rollers 8 and 10, the strip 7 is fed, following an oblique trajectory, to a lower roller 40. From the lower roller 40, the strip 7 is fed, following a vertical trajectory, toward an additional upper roller 41. The strip finally is fed from that upper roller 41 to the lower roller 9, again following an oblique trajectory.

The apparatus according to FIG. 2 comprises two pairs of ramps 19 and 42 equipped, each one of them, with nozzles 20 and 43, the ramps of each one of those two pairs of ramps 19, 42 are positioned on each side of strip 7 along the vertical section 18 of the latter. Each one of the ramps 19 and 42 sprays, through its nozzles (20, 43), demineralized water over strip 7.

In addition, over the vertical trajectory (section 44) followed by strip 7 between the return rollers 40 and 41, the strip is first subjected to the action of the jets of demineralized water delivered by the nozzles 45 of a pair of ramps 46. The strip is then subjected to the action of jets of distilled water coming from nozzles 22 of the pair of ramps 21.

It is thus seen that over its vertical trajectory or section 18, the strip receives jets of demineralized water from ramps 19 and 42, while, on its second vertical trajectory or section 44, demineralized water is first sprayed through ramps 46, then distilled water through ramps 21. In this way, it is possible to improve the effect of the cleaning and/or decontamination treatment of the strip of thermoplastic material 7.

Figure 4:
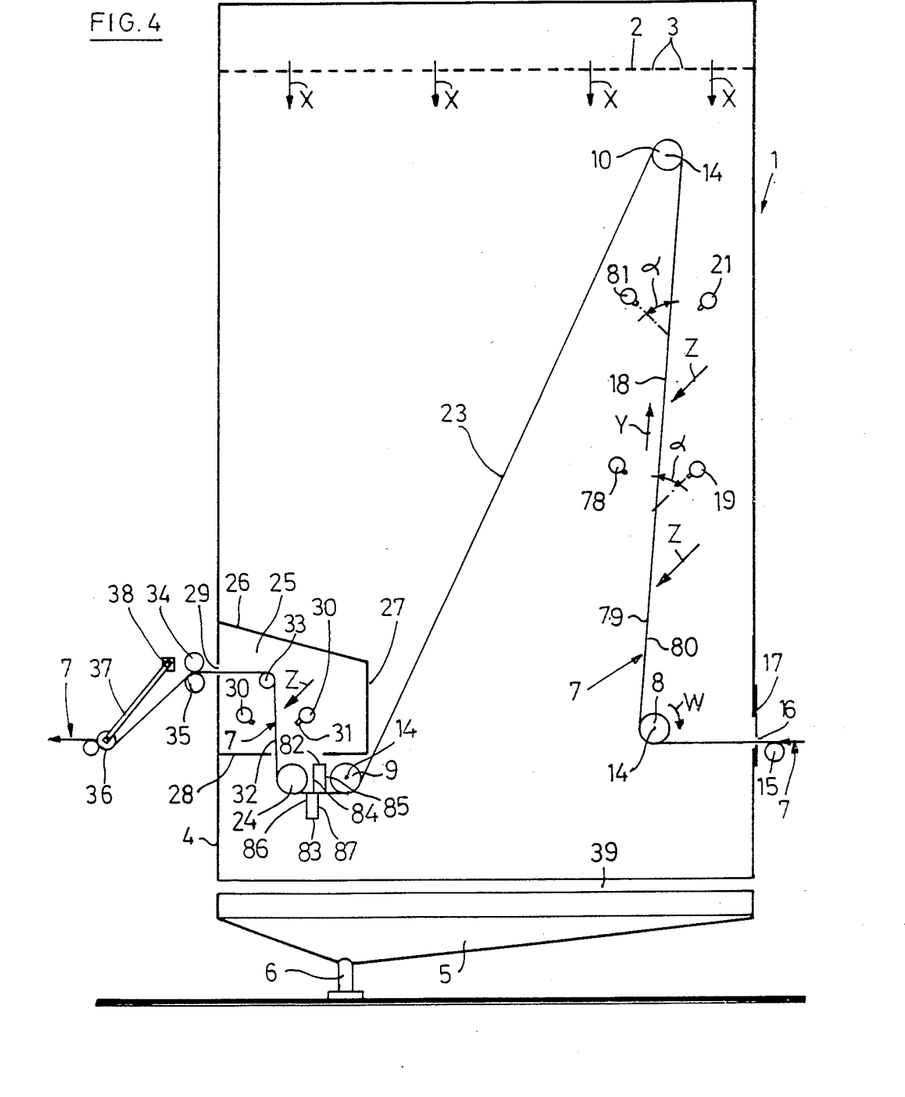
FIG. 4 illustrates a diagramatic view, in lateral elevation, of another embodiment of the apparatus of the present invention.

In a third embodiment, illustrated in FIG. 4 of the apparatus of the present invention, the apparatus differs from the one illustrated in FIG. 1 in that section 18 of the strip 7, located between the lower roller 8 and the upper roller 10, is slanted with respect to the vertical direction, in the direction of rotation W of the lower roller 8.

From the lower return roller 8, the strip follows a slanted trajectory toward upper roller 10 which sends it back by rotating in a counterclockwise direction, toward lower roller 9, following a slanted trajectory. On the slanted section 18, located between the return rollers 8 and 10, the strip 7 is subjected to the action of the cleaning and/or decontamination means.

Those cleaning and/or decontamination means comprise a first pair of ramps 19, 78. The ramps 19, 78, connected to a source of demineralized water, spray jets of demineralized water over the opposite faces 79, 80 of strip 7, while the latter moves upwardly inside the enclosure 1.

Above the first pair of ramps 19, 78 there is assembled a second pair of ramps 21, 81. The second pair of ramps 21, 81 spray distilled water over the opposite faces 79, 80 of the strip 7.

By means of the spraying of demineralized water and of distilled water with an adjustable rate of flow and pressure, a dynamic effect of cleaning and/or decontamination is exerted over the opposite faces of the strip 7, so as to free the latter, for the most part, of the particles and micro-organisms which are adhering to it.

The ramps 78, 81 are positioned so as to permit the spraying of the above-mentioned liquid over the face 79 of the slanted section 18, this face 79 being opposed to the face 80 of the strip in contact with the lower return roller 8. The slant of the above section 18, relative to the vertical direction, preferably is between approximately 5° and about 30°.

The slant enables the liquids sprayed over the face 79 of the slanted section 18 to run down on that face, carrying away the contaminating particles toward the lower roller 8. Close to the latter, the liquid loaded with contaminating particles becomes separated from the strip 7 and it falls, by gravity, into the hopper 5. Because of that slant, the liquid which is sprayed over face 79 remains in contact with the latter. The excess pressure of the sterile air inside the enclosure allows for the application of an additional contact force of the liquid on that face. The liquid present on that face, therefore, is less subject to possible projections or carryings away of liquid as a result of the stream of sterile air, or to the formation of large drops on the strip. This permits preventing some of the liquid loaded with contaminating particles from being redeposited on the face 79 of an already cleaned part of the strip.

After its passage over the return roller 9, the strip 7 further passes over the return roller 24 which is also of the "squirrel-cage" type, then it enters drying chamber 25 which is formed by walls 26, 27, 28, the drying chamber 25 being mounted inside enclosure 1, immediately upstream from the outlet 29 of the latter.

Between the rollers 9 and 24, the strip is subjected to a pre-drying by two systems 82, 83 equipped with two scrapers 84, 85; 86, 87. Scraper 84 of system 82 scrapes the section of the strip located between the scrapers 86, 87 of the other system 83.

These systems 82, 83 make it possible for the almost complete removal of the liquids present on the strip before the latter enters the drying chamber 25, and therefore they facilitate the operation of that chamber.

Figure 5:
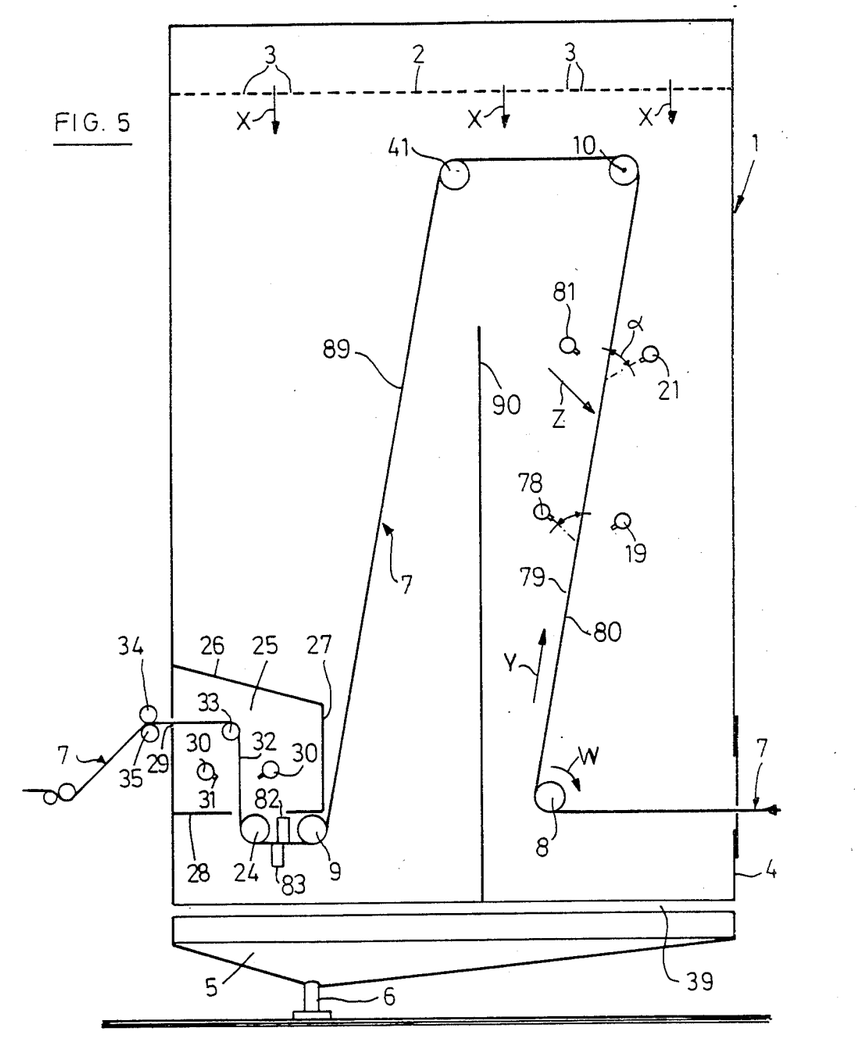
FIG. 5 illustrates a view, similar to that illustrated in FIG. 1, of another embodiment of the apparatus of the present invention.

A fourth embodiment of the apparatus of the present invention, is illustrated in FIG. 5, and is different from the third embodiment only in that the apparatus comprises two return rollers 8, 9, spaced apart from each other, at the lower part of enclosure 1, and two return rollers 10, 41, also spaced apart from each other, at the upper part of enclosure 1. Accordingly when the strip passes over those different return rollers, the strip of film presents three successive sections, that is, a first slanted section 18 which is subjected to the spraying of one or several cleaning and/or decontaminating liquids, a second section 88, approximately horizontal, and a third section 89, preferably slanted.

In this embodiment, a vertical partition 90 is placed inside the enclosure, between the lower roller 8 and the lower roller 9, so as to prevent particles carried away by the above-mentioned cleaning and/or decontaminating liquid from being redeposited on the strip when that liquid becomes separated from the strip and falls into hopper 5.

Figure 6:
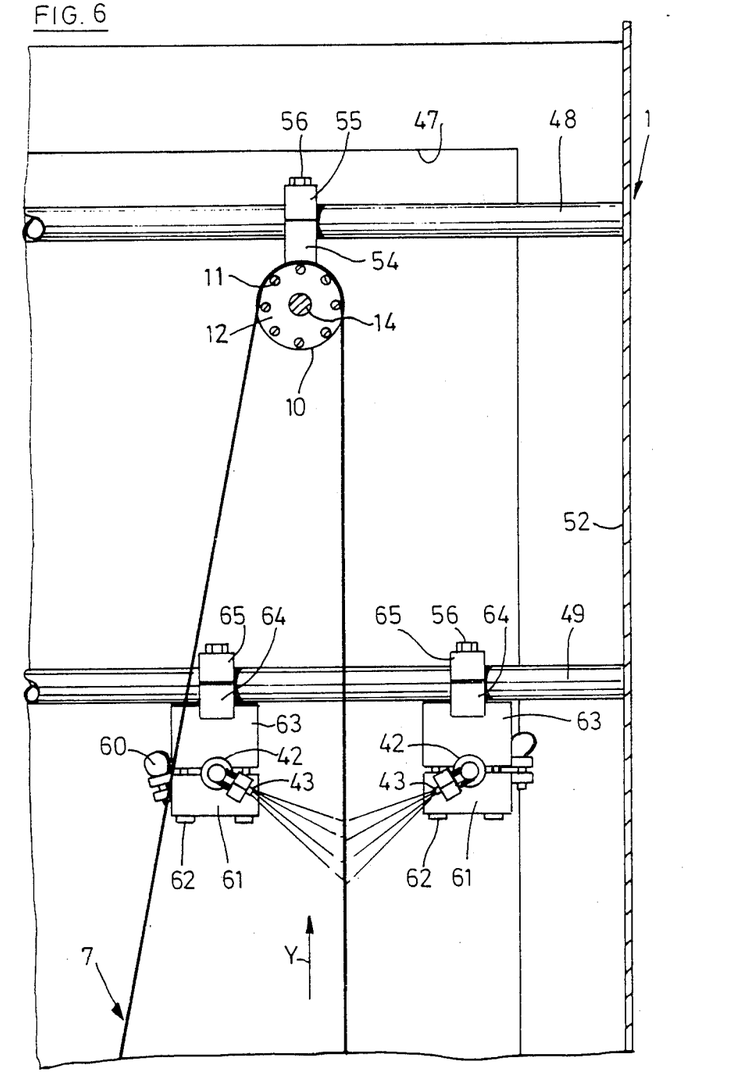
FIG. 6 illustrates, a detailed view of a part of the apparatus illustrated in FIG. 3.

FIGS. 6 and 7 in the attached drawing illustrate details of the embodiment of the device according to the invention, diagramatized in FIG. 2.

As seen in FIG. 6, the enclosure 1 comprises a box which may present on two opposite faces, parallel to the direction of forward motion of strip 7 of thermoplastic film glass doors 47 which permit to check the functioning of the cleaning device. If desired, the glass doors 47 can also provide access to the inside of the enclosure.

Fixed bars 48, 49, 50 and 51, which can have a tubular construction and be assembled parallel to one another, inside the enclosure 1, hang from the upstream wall 52 and from the downstream wall 53 of the latter. For each one of the bars 48 to 51, extending to the front of enclosure 1, there is a corresponding bar at the rear of the enclosure. Thus there are, inside the enclosure 1, four pairs of fixed bars 48 to 51, from which hangs the equipment contained in the enclosure.

To the pair of fixed bars 48 are hung the upper return rollers 10 and 41 the shafts 14 of which rotate freely inside holes made in tabs 54 affixed to riders 55 hooked to bars 48 by means of bolts 56. With this arrangement, the positions of the return rollers 10 and 41 may be modified by separating them more or less from each other by simply sliding the riders 55 on bars 48.

The pairs of ramps 21 and 42 which have a circular section are hung to the pair of fixed bars 49. At each end, each one of those ramps includes a cylindrical part 57 of larger diameter, on which is tightened by a tightening ring 58, formed of two semi-circular arms 58′ and 58″, hinged together at 59 by one of their ends and equipped with a butterfly screwnut 60 at their other end. Arm 58′ of the tightening rings is attached to a member 61 polygonal in shape, which is fixed by bolts 62 to a second polygonal member 63. The members 61 and 63 each have along their edges a semi-circular notch which encircles the ramp. Each small plate formed by the members 61 and 63 hangs from a tab 64 movably affixed to a rider 65 hanging from one of the bars 49.

When rings 58 are loosened by an unscrewing of the screwnuts, it is possible to modify the orientation of nozzles 22, 43 carried by ramps 21, 42, by causing said ramps to rotate on their longitudinal axis. As for members 61 and 63 which form the small plates, they may be loosened from each other by unscrewing of bolts 62, to permit a longitudinal displacement of the ramps 21 and 42, relative to a tubing 66 into which each ramp is telescopically engaged. The tubing 66 functions to feed the cleaning liquid to the ramps of each pair of ramps 21, 42 on the tubing 66 there is engaged another tubing 67 to which is telescopically connected a duct 68 connected to a source (not illustrated) of cleaning liquid. A tightening ring 69, similar to the afore-mentioned ring 58, functions to tighten the end of duct 68 on the adjacent end of tubing 67.

The means for the suspension and the feeding of the different ramps are the same as those previously described above, and in FIGS. 3, 6 and 7 they are represented by the same reference symbols. Duct 68, connected to a source of demineralized water (not illustrated), feeds the pairs of ramps 19, 42 and 46, while another duct 68, connected to a source of distilled water (not illustrated) feeds the ramps 21.

The shaft of the lower return rollers 8, 40, 9 and 27 can rotate freely inside a perforation made in tabs 70, 71 affixed to the chassis of enclosure 1.

The fixed bars 50 support, in the same manner as the fixed bars 49, the pairs of ramps 19 and 46.

Finally, the fixed bars 51 serve as a support for the drying ramps 30. A duct 72, connected to a source of sterile drying air under pressure (not illustrated), is tightened by a movable tightening ring 73 on a first tubing 74 connected to another tubing which, through each one of its ends, feeds the drying ramps 30. The orientation of the nozzles of the ramps 30, as well as the longitudinal position of the latter, may be modified by means (tightening ring 58, members 61, 63, tabs 64 and rider 65) identical to those used for the different ramps 19, 21, 42 and 46 which spray the liquids.

Figure 3:
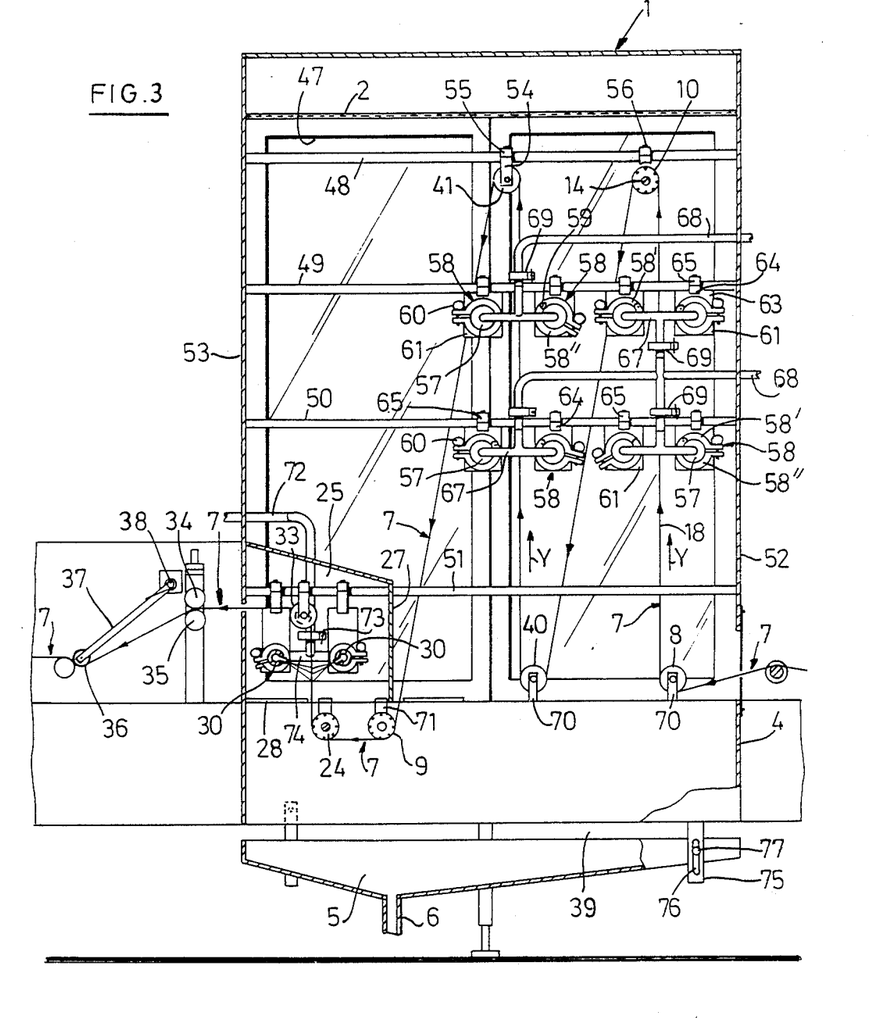
FIG. 3 a detailed view, in lateral elevation, of the embodiment of the apparatus illustrated in FIG. 2.

As shown in FIG. 3, the tabs 75 affixed by one of their ends to the lower part of the enclosure 1, have a slot 76 receiving a bolt affixed to the upper part of the collecting hopper 5. On that bolt is screwed a screwnut 77. This system makes it possible to adjust the level of the upper edge of hopper 5 and, consequently, the width of slit 39 through which can escape the sterile air under pressure, sent into enclosure 1 by the perforations 3 in the ceiling 2 of the latter.

Experiments for washing and decontaminating films with the embodiment of the present invention illustrated in FIG. 4, have demonstrated the following for a strip made of a layer of high-density polyethylene and of a layer of low-density polyethylene:

1. Cleaning of a low-density polyethylene face (79) of a web of film which was the internal face of the perfusion bags, has made it possible to obtain perfusion liquid bags containing few sub-micron particles, the latter mostly coming from the particles present on that face. Thus, with the apparatus according to the present invention, it has been possible to reduce the number of sub-micron particles (from 2 to 5 microns) to less than 250 particles, even to less than 60 particles, per ml of perfusion liquid. That low-particle concentration makes it possible to satisfy the concentration thresholds accepted by different health organizations, those thresholds generally ranging between 500 and 1,000 2-micron sub-micronic particles per ml of perfusion liquid.

2. The pre-drying means 82, 83 make it possible to reduce to one third the air consumption necessary for the drying in the chamber 25, as compared to the consumption necessary in a device in which no such means are mounted.

This lower consumption also appreciably reduces the noise level in the chamber 25.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A cleaning and/or decontaminating device for cleaning and/or decontaminating a continuous strip of film of thermoplastic material, comprising an enclosure having therein sterile air maintained under pressure, the continuous strip is made to move along a sinuous trajectory inside the enclosure around return rollers between an inlet and an outlet of the enclosure, at least one approximately horizontal ramp, equipped with nozzles, is mounted in the enclosure for spraying, on at least one face of the strip, jets of a cleaning and/or decontaminating liquid, with the liquid, after contact with the strip and therefore loaded with contaminating particles detached from the strip, being allowed to drip to a collector positioned below a lower end of the enclosure and designed to collect the spent liquid, and a slit of adjustable width for controlling the release of sterile air from the enclosure positioned between the lower end of the enclosure and the collector.

2. A device according to claim 1 wherein the ramp is positioned so as to permit the spraying of said liquid over a first face of a slanted section of the strip which follows an ascending trajectory and which extends between a lower return roller and an upper return roller, the first face being opposed to the second face in contact with the lower return roller, and being slanted relative to the vertical, in a direction of the rotation of the lower roller.

3. A device according to claim 2 wherein the slope of the slanted section, relative to the vertical, is between approximately 5° and about 30°.

4. A device according to claim 1 wherein the nozzles of the ramp are oriented in a direction approximately opposite a direction of motion of the strip.

5. A device according to claim 4 including at least one pair of ramps having nozzles, mounted on each side of the strip, at approximately the same level.

6. A device according to claim 4 including several ramps mounted in a direction transverse to that of the strip allowing the nozzles to spray a cleaning and/or decontaminating liquid over the successive sections of said strip which is imparted with a forward motion inside the enclosure and is guided inside the enclosure over return rollers.

7. A device according to claim 6 wherein the ramps are mounted at different levels of a same section of the strip.

8. A device according to claim 1 wherein the continuous strip is subjected first to streams of demineralized water, then to streams of distilled water.

9. A device according to claim 1 including a first return roller located approximately at the level of intake for the continuous strip inside enclosure at the lower part of the enclosure a second return roller located near the upper end of the enclosure and a third return roller located near the lower end of enclosure and shifted relative to the first roller, allowing the strip, which is moving inside the enclosure to move upward, following a slanted trajectory between the first roller and the second roller, then downward between the second roller and the third roller, a first group of two opposite ramps are positioned on each side of the strip being located on the trajectory of strip between the first and the second rollers, at a level higher than that of the first group of ramps, nozzles of the first group of ramps spraying demineralized water over strip, while nozzles of the second group of ramps are spraying distilled water over the strip.

10. A device according to claim 1 including three return rollers spaced apart from one another at a lower part of the enclosure, and two return rollers, also spaced apart from each other, at an upper part of the enclosure and being so constructed and arranged that as the strip passes over those different return rollers the strip of film has four successive sections, alternately vertical and steeply inclined between the inlet and the outlet of the enclosure, two groups, each including two ramps positioned opposite to each other, are mounted close to each one of the vertical sections of the strip at different levels, the ramps including nozzles, the nozzles of the two groups of opposite ramps adjacent to the first vertical section of the strip extending downstream from the inlet of the enclosure, as are the nozzles of the group of opposite ramps adjacent to the second vertical section of the strip, close to the lower end of this second vertical section, spraying demineralized water over the opposite faces of that first vertical section of the strip and on the opposite faces of the lower part of the second vertical section of the strip, close to the upper part of the enclosure, are spraying distilled water over the opposite faces of that second vertical section of the strip.

11. A device according to claim 1 wherein the nozzles of the ramp are oriented toward the strip of film, so as to form with the film an angle of approximately 30° to about 90°.

12. A device according to claim 1 including means for adjusting the orientation of the nozzles of the ramp.

13. A device according to claim 1 including means for adjusting at least one of the longitudinal position, the transverse position, or the level of the ramp.

14. A device according to claim 1 including means for drying the strip mounted immediately upstream from the outlet of the enclosure.

15. A device according to claim 14 wherein the drying means includes means for blowing air mounted inside a chamber through which the film passes upstream from the outlet of the enclosure.

16. A device according to claim 15 wherein the means for blowing air includes at least one ramp that is fed conditioned air and is equipped with nozzles which blow the conditioned air over at least one of the faces of the strip.

17. A device according to claim 1 wherein the enclosure includes a ceiling having multiple perforations that allows the passage of the sterile air to form the atmosphere of sterile air under pressure inside the enclosure.

18. A cleaning and/or decontaminating device for cleaning and/or decontaminating a continuous strip of a film of thermoplastic material comprising an enclosure having therein a sterile air maintained under pressure, the continuous strip is made to move along a sinuous trajectory inside the enclosure around return rollers between an inlet and an outlet of the enclosure, the return rollers including two return rollers spaced apart from each other at the lower part of the enclosure and two return rollers also spaced apart from each other at the upper part of the enclosure, the enclosure further including at least one approximately horizontal ramp, equipped with nozzles for spraying on at least one face of the strip jets of a cleaning and/or decontaminating liquid, such that when the strip passes over the different return rollers, the strip of film defines three successive sections, that is, a first slanted section which is subjected to spraying with the cleaning and/or decontaminating liquids, a second section approximately horizontal and a third section approximately generally vertical.

* * * * *